United States Patent Office 3,269,581
Patented August 30, 1966

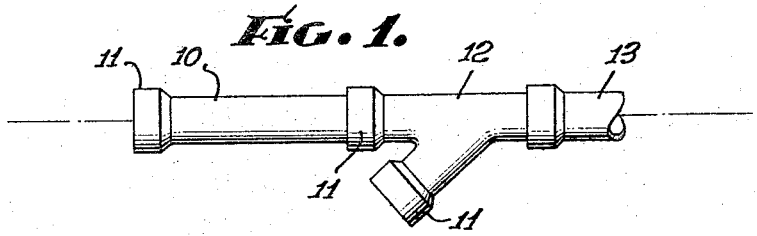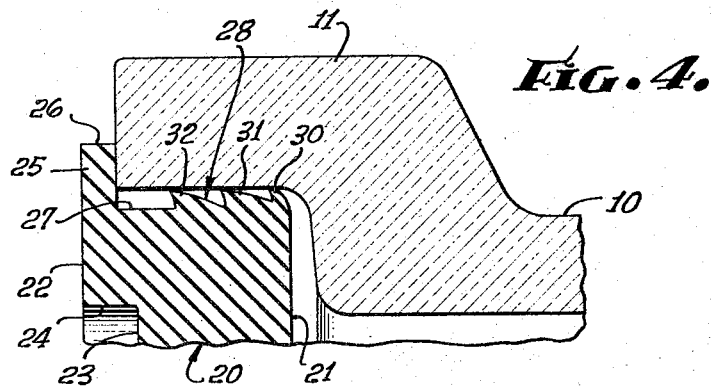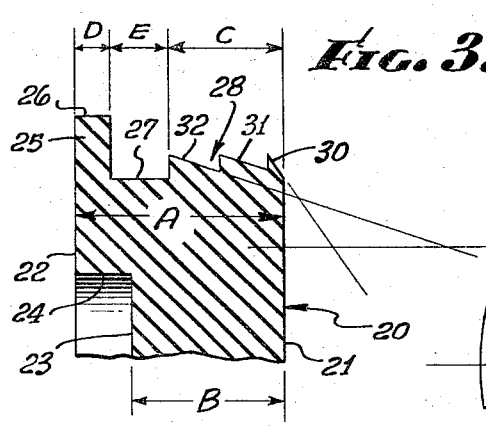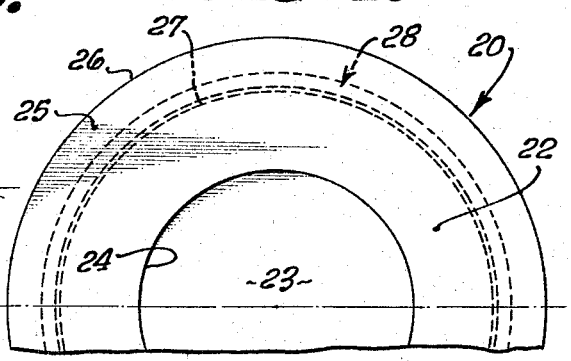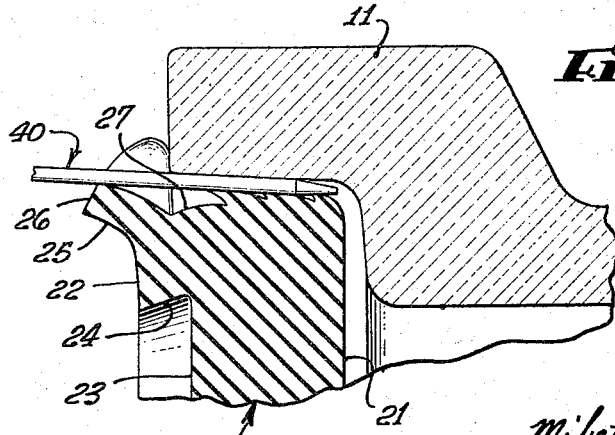

3,269,581
PIPE STOPPER PLUG
William G. Calder, Los Angeles, Calif., assignor to Joints, Inc., Culver City, Calif., a corporation of California
Filed Apr. 5, 1965, Ser. No. 445,521
5 Claims. (Cl. 220—24)

The present invention relates to a pipe stopper plug and more particularly to a stopper plug which is self-aligning and self-centering upon being inserted in a pipe, cannot be forced beyond retrieval, and which is responsive to pressure in the pipe to effectively seal the pipe.

Whenever a pipe line is laid, such as a sewer line, waterline, gasline or a soil line, it is desirable to check the line for leaks prior to putting the line into operation or covering the pipe with soil or concrete. In order to check a line out, the open ends of the line must be sealed in some manner and then a fluid pressure applied within the line. After the pressure is applied, the joints in the line may be inspected for seepage of fluid and imperfect joints reworked to make certain that the line is leakproof.

A line may have many branch lines which are connected to a main line through the use of Y and T connections. This arrangement, which is found quite often in a sewer line system for a tract of homes or a sewer system for a large building, may involve a considerable number of pipe openings which must be sealed by a workman and then opened by him again after the line check has been made. Because of the multitude of pipe openings involved, labor costs in testing the line can be quite high unless these pipe ends can be quickly and positively closed for the test and then quickly and easily opened after the test.

The large manufacturing tolerances in inside pipe diameters of any particular size of pipe (especially of ceramic pipe) make it difficult, if not impossible, to positively close the end with a standard prior art plug. In some instances, this plug might fit tightly and with difficulty and, in other instances, it may have a sloppy fit and cant to one side and leak or be unable to resist test pressures.

The present invention provides a simply constructed plug which can be easily and quickly inserted into an open pipe end, adapt itself to considerable variation in inside diameter of the pipe, and which will make an effective seal and closure capable of withstanding test pressure applied within the pipe.

The plug of this invention is provided with means to limit the insertion of the plug within the pipe so that the plug cannot be inserted too far into a straight end pipe and become lost. Moreover, the present plug responds to test pressures to increase its closure or sealing power.

An object of this invention is to provide a simply constructed pipe stopper plug which can be easily and quickly inserted into the end of a pipe, accommodate itself to variations in diameter and roundness, which will maintain an effective seal while the pipe is being tested with fluid under pressure, and which can be easily and quickly removed after the pipe has been tested.

Another object is to disclose and provide preferred relationships between various portions of a plug so that the resilient material of the plug is utilized to best advantage during various steps and conditions to which the plug is subjected in use.

Other objects and many of the attendant advantages of this invention will be readily appreciated from the following detailed description when considered in connection with the accompanying exemplary drawings wherein:

FIG. 1 is a side view of pipe line with bell-end type openings which need be plugged in order that the line may be tested;

FIG. 2 is an end view of one-half of a circular stop plug;

FIG. 3 is an enlarged section of the rim portion of the stop plug;

FIG. 4 is an axial cross-sectional view of a rim portion of a plug inserted into an end of a pipe;

FIG. 5 is an axial cross-sectional view of the rim portion of the plug during removal of the plug from the pipe end.

FIG. 1 illustrates one end of a pipe line which has been laid and which is now to be tested for leaks, imperfect joints, etc. The pipe line illustrated is shown to be made from bell-end pipe, the length 10 having a bell-end 11. It also includes a branch or Y 12 also provided with an open bell-end 11. The section 13 may be quite long and include other T's or Y's having open ends which must be plugged before the line is tested by the introduction of pressure fluid into the line. It is to be understood that although a section of pipe line made of bell-end pipe is illustrated, the same or similar situations occur when screw threaded or straight end pipe is employed. The stopper plug of the present invention is adapted for insertion into the open end of any type of pipe and FIG. 2 is an end view of the rear or outward face of one-half of a stopper plug of this invention, FIG. 3 being a somewhat enlarged and partially diagrammatic section through the plug illustrated in FIG. 2.

The preferred form of stopper plug of the present invention is generally indicated at 20 and includes a circular front pressure receptive face (which may be also called the internal face since it will be exposed to pressure fluid within the pipe), an external or rear face 22, the rear face including a central recessed portion 23 defined by a wall 24. The front face 21 is circular and virtually planar; the rear surface or face is also circular and virtually planar but is of larger diameter than the front face since the rear face includes a radially and outwardly extending lip 25 terminating in the outer edge lip portion 26.

The circumferential edge of the plug includes the lip surface 26 on said lip 25, a relief surface indicated at 27 and a sealing surface generally indicated by 28 which terminates in the front pressure resurface face 21.

It may be stated at this time that the entire stopper plug is preferably made of a resilient material such as a rubber composition, synthetic rubber, a dense form of polyurethene or similar synthetic, all of these resilient materials preferably having a Shore durometer rating of between about 45 and 55 scale A; it has been found that in practice materials of this resiliency are eminently suited for the purposes of this invention.

As shown in FIG. 3, the so-called sealing surface, generally indicated at 28, is preferably provided with a plurality of rearwardly and upwardly inclined ridges such as 30, 31 and 32. The frontal ridge is preferably at a greater angle to the axis of the cylindrical stopper than the subsequent ridges such as 31 and 32. At least the frontal ridge 30 has a minimum diameter (where it merges into the front pressure receptive face 21) which is slightly smaller than the mean diameter of the pipe into which said stopper is to be inserted; the subsequent ridges such as 31 and 32 may also have minimum diameters which are substantially equal to or slightly smaller than the mean diameter of the pipe. All of the ridges have maximum diameters which are slightly greater than the mean diameter of the pipe into which the stopper is to be inserted.

Certain preferred relationships need be embodied in the preferred form of stopper plug in order to most effectively utilize the resilient characteristics of the body material and thereby attain the self-centering, self-sealing abilities of the plug, ease of insertion, freedom from canting, and ease of removal from a pipe. The greatest thickness of the stopper occurs in the rim and is indicated at A; this thickness is indicated as being composed of the circumferential sealing surface 28 whose extent is indicated at C, the circumferential relief surface 27 whose extent is indicated at E and the circumferential lip surface 26 indicated at D. The thickness of the plug at its central recess portion is indicated at B and in the preferred form of the invention such thickness B should be at least equal to the width of the sealing surface C but not exceeding the combined width of the sealing and relief surfaces C and E. Moreover, the depth of the recess is preferably greater than the width D of the lip. As previously indicated the diameter of the front pressure receptive face 21 is but slightly smaller than the minimum diameter of the pipe; the diameter of the recess 23 should be smaller than the diameter of front face 21; the diameter of the relief edge surface 27 is preferably slightly smaller than the diameter of front face 21. The thickness D of the lip 26 is preferably smaller than the depth of the recess 23 or the depth of the wall 24.

Differently expressed, it is desirable that the thickness D of lip 26 be between about 30% and 70% of the depth of recess 23 and that the relief surface 27 be of a width E of between about 70% and 125% of the depth of recess 27.

The width C of the sealing section 28 is usually between about 40% to 75% of the total thickness A of the stopper plug. In actual practice, on stopper plugs of this invention adapted for use on pipe of 4" to 6" in diameter, the diameter of the recess 23 is about ¾" to 1¼" less than the diameter of relief surface 27, so that desired flexibility of the lip 25 (during removal of a plug) is attained.

When the stopper is inserted into the open end of a pipe the initial sharply inclined ridge 30 will readily enter the pipe and contract the interior surface of the pipe peripherally. In general practice, a workman will press or force the stopper into the pipe by the application of pressure or blows with a mallet upon the recess 23 in the rear face 22 of the stopper. The resiliency of the thickness B in the central portion of the stopper will be utilized in permitting a relaxation in the ridges 31 and 32 so as to facilitate ready insertion of the stopper into the pipe as soon as such driving force is eliminated the ridges firmly contact against the inner surface of the pipe. A self-centering action is thus obtained and it is impossible to drive the stopper beyond a point of retrieval into a pipe because the end of the pipe will contact the radially extending lip 25.

After the stoppers are in position and hydraulic fluid is introduced into the pipe, the front pressure receiving face 21 transmits the pressure to the sealing ridges 31 and 32 thereby completely sealing and closing the end of the pipe so that no leaks occur at the plugged up ends. Instead, leaks may be observed at various other joints along the length of the pipe and either repaired, checked or otherwise corrected. After the pressure has been relieved and the test is over, the plug can be readily removed from the end of the pipe as indicated in FIG. 5. The workman can readily insert a blunt screwdriver or other instrument 40 by bending back the lip 25 as shown in FIG. 5 and forcing the instrument between the inner surface of the pipe and the various sealing ridges. It will now be noted that since the thickness of the lip 25 indicated at D is materially less than the depth 24 of the recess 23 and the relief section 27 (E) is of appreciable width and of a diameter not exceeding the mean diameter of the pipe and preferably of slightly less diameter, the entire rim area of the stopper is easily distorted (as in FIG. 5), permitting the workman to readily insert the tool and pry the stopper out of its sealing position within the end of the pipe. It will thus be seen that the various relationships and proportions of the preferred form of stopper cooperate with the resiliency of the body material so as to provide a stopper plug which is eminently suited for the uses contemplated.

All changes and modifications coming within the scope of the appended claims are embraced hereby.

I claim:

1. A self-aligning, self-centering, pressure resistant stopper plug readily insertable into and removable from the open end of a pipe, comprising: a cylindrical plug of resilient material, said plug having a circular internal virtually planar pressure receptive front face, a rear face including a central recessed portion, the diameter of said rear face being greater than of the pressure receptive face and including a radially extending lip, and a circumferential edge including a lip surface on said lip, a relief surface and a sealing surface terminating in said front pressure receptive face; the thickness of the plug at its central recessed portion being at least equal to the width of the sealing surface but not exceeding the combined width of the sealing and relief surfaces; the thickness of said lip being less than the depth of the recess in said rear face; said relief surface cooperating with said rear recess to allow said lip to be rearwardly flexed during removal of a plug from a pipe.

2. A self-aligning, self-centering, pressure resistant stopper plug readily insertable into and removable from the open end of a pipe, comprising: a cylindrical plug of resilient material, said plug having a circular internal virtually planar pressure receptive front face, a rear face including a central recessed portion, the diameter of said rear face being greater than of the pressure receptive face and including a radially extending lip, and a circumferential edge including a lip surface on said lip, a relief surface and a sealing surface terminating in said front pressure receptive face; the thickness of the plug at its central recessed portion being at least equal to the width of the sealing surface but not exceeding the combined width of the sealing and relief surfaces; the thickness of said lip being less than the depth of the recess in said rear face; the circumferential sealing surface including a plurality of rearwardly and upwardly inclined ridges having a minimum diameter slightly smaller than the mean diameter of a pipe to be plugged and a maximum diameter slightly larger than the mean diameter of such pipe, said pressure receptive front face being adapted to transmit forces applied thereto to said ridges to effectively close an end of a pipe containing such plug.

3. A self-aligning, self-centering, pressure resistant stopper plug readily insertable into and removable from the open end of a pipe, comprising: a cylindrical plug of resilient material, said plug having a circular internal virtually planar pressure receptive front face, a rear face including a central recessed portion, the diameter of said rear face being greater than of the pressure receptive face and including a radially extending lip, and a circumferential edge including a lip surface on said lip, a relief surface and a sealing surface terminating in said front pressure receptive face; the thickness of the plug at its central recessed portion being at least equal to the width of the sealing surface but not exceeding the combined width of the sealing and relief surfaces; the thickness of said lip being less than the depth of the recess in said rear face; the circumferential sealing surface including a plurality of rearwardly and upwardly inclined ridges having a minimum diameter slightly smaller than the mean diameter of a pipe to be plugged and a maximum diameter slightly larger than the mean diameter of such pipe, said pressure receptive front face being adapted to transmit forces applied thereto to said ridges to effectively close an end of a pipe containing such plug; said relief surface cooperating with said rear recess to allow said lip to be rearwardly flexed during removal of a plug from a pipe.

4. A self-aligning stopper plug as stated in claim 1 wherein the sealing surface has a maximum diameter slightly larger than the internal diameter of a pipe into which the plug is adapted to be inserted and the diameter of said front face, said relief surface has a diameter smaller than the diameter of the sealing surface and internal diameter of a pipe, and said lip surface has a diameter greater than the internal diameter of a pipe whereby said lip may abut the end of a pipe upon insertion of such plug thereinto.

5. A self sealing stopper plug as stated in claim 2 wherein the maximum diameter of at least some of said inclined ridges exceeds the internal diameter of a pipe into which said plug is adapted to be inserted and the diameter of said front face, said relief surface has a diameter smaller than the internal diameter of such pipe, and said lip surface has a diameter greater than the internal diameter of a pipe whereby said lip may abut the end of a pipe upon insertion of such plug thereinto.

No references cited.

THERON E. CONDON, *Primary Examiner.*

J. B. MARBERT, *Assistant Examiner.*